US008787954B2

(12) United States Patent
Richardson et al.

(10) Patent No.: US 8,787,954 B2
(45) Date of Patent: Jul. 22, 2014

(54) METHOD AND APPARATUS FOR SYNCHRONIZING A WIRELESS NETWORK WITH AN EXTERNAL TIMING SOURCE

(75) Inventors: Thomas J. Richardson, South Orange, NJ (US); Saurabh Tavildar, Jersey City, NJ (US); Simone Merlin, San Diego, CA (US); Santosh Paul Abraham, San Diego, CA (US); Zhibin Wu, Bedminster, NJ (US); Junyi Li, Chester, NJ (US); Nilesh N. Khude, Bridgewater, NJ (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 13/349,245

(22) Filed: Jan. 12, 2012

(65) Prior Publication Data
US 2013/0183905 A1    Jul. 18, 2013

(51) Int. Cl.
*H04B 15/00*    (2006.01)

(52) U.S. Cl.
USPC .......................................................... 455/502

(58) Field of Classification Search
USPC ............... 455/67.11, 67.13, 13.2, 502, 181.1, 455/231, 500; 370/311, 350
See application file for complete search history.

(56) References Cited

U.S. PATENT DOCUMENTS

| 7,573,865 | B2 | 8/2009 | Shvodian |
| 8,018,950 | B2 | 9/2011 | Wu et al. |
| 2007/0207836 | A1 | 9/2007 | Gormley et al. |
| 2010/0135334 | A1 | 6/2010 | Briscoe et al. |
| 2011/0170465 | A1 | 7/2011 | Tavildar et al. |

FOREIGN PATENT DOCUMENTS

WO    2006067271 A1    6/2006

OTHER PUBLICATIONS

International Search Report and Written Opinion—PCT/US2013/021276—ISA/EPO—Mar. 1, 2013.

*Primary Examiner* — Eugene Yun
(74) *Attorney, Agent, or Firm* — James K. O'Hare

(57) ABSTRACT

A communications device synchronizes itself with respect to an external reference signal, e.g., a GPS signal. The communications device detects timing reference signals, e.g., beacon signals, from a communications network. If the communications device determines that the network is not synchronized to the external timing reference signal, the communications device operates as a master timing control device. In various embodiments, when operating as a master timing control device the wireless communications device communicates time stamps, e.g., in beacon signals, which indicate a greater passage of time than the actual passage of time. When operating as a master timing control device the communications device transmits network timing reference signals at a higher rate than is being used by the network to seize control of network timing and become the master timing control device. The communications device drives the network timing to synchronize network timing to the external timing reference.

20 Claims, 15 Drawing Sheets

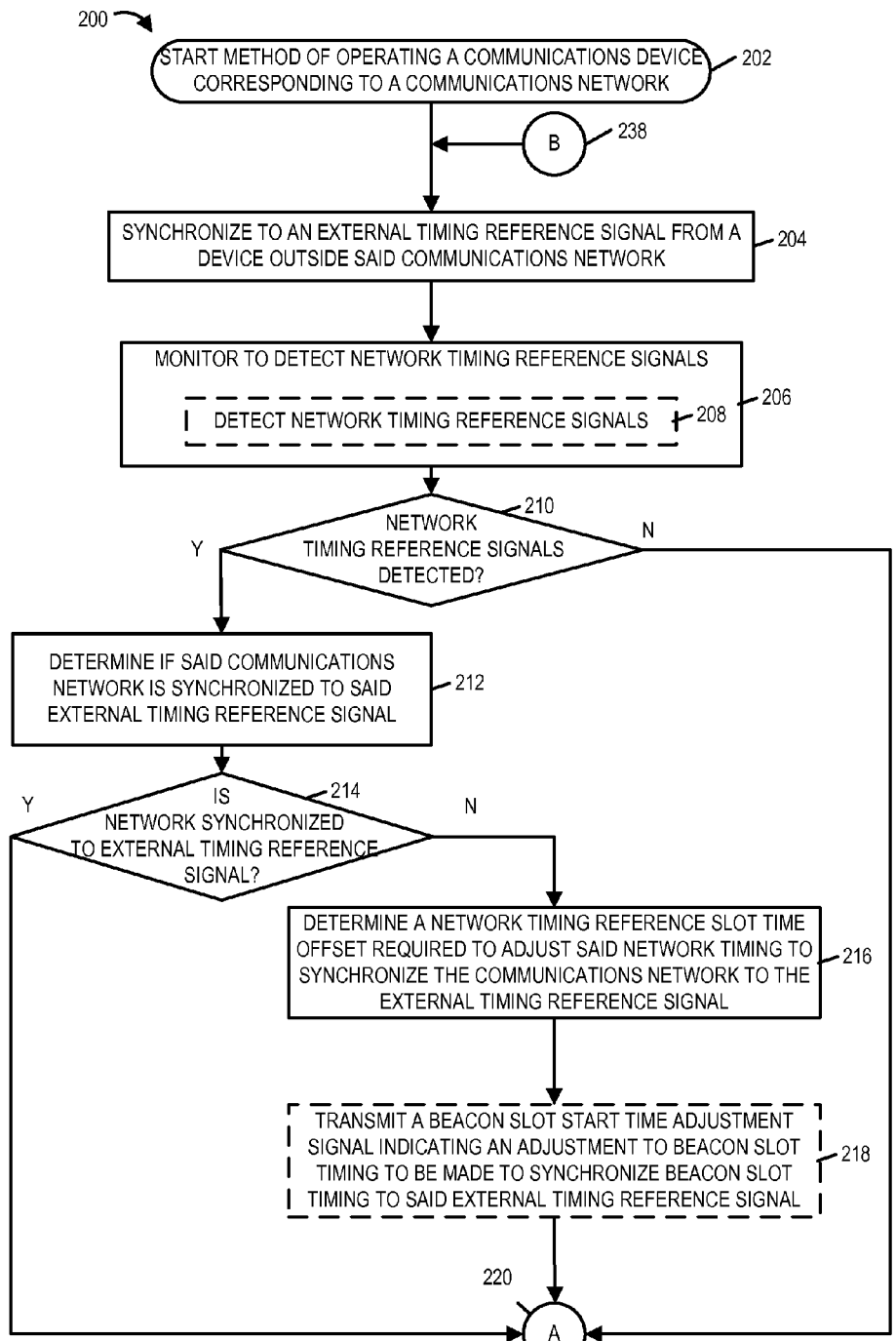

METHOD AND APPARATUS FOR SYNCHRONIZING A WIRELESS NETWORK WITH AN EXTERNAL TIMING SOURCE

FIELD

Various embodiments relate to wireless communications, and more particularly to synchronizing devices in a wireless communications network.

BACKGROUND

WiFi chips tend to draw alot of current while in use. This high current drain often makes it infeasible to run certain kinds of WiFi applications on cellular devices. Even though certain power saving features have been proposed, they do not appear to be efficient enough to run certain WiFi applications on a cellular device even when the device is in passive mode without significantly impacting the standby time. A few examples of such applications include: peer discovery, routing information exchanges, and traffic monitoring.

While synchronizing to a reliable external timing source such as a GPS signal can facilitate timing synchronization between WiFi devices, all WiFi devices may not be able to receive the external timing signal because of their location and/or because they do not include a receiver capable of receiving such a signal. Accordingly, in WiFi systems it is important that beacon signaling which is used in the WiFi protocol continue to be used between devices to maintain device synchronization even if one or more devices are capable of receiving signals from an external non-WiFi timing signal source.

Individual devices in WiFi rely on their internal timing clocks to maintain ongoing timing synchronization to determine the passage of time from a point in time where a synchronization operation occurs, e.g., from a point in time where a timing adjustment is made based on the receipt of a beacon signal.

It would be desirable if a device with a high degree of timing reliability, e.g., because of its ability to maintain and update its timing based on a reliable external timing signal such as a GPS signal could operate as a master device in a WiFi network and control the timing of the devices in the WiFi network. However, it should be appreciated that a large amount of signaling overhead with regard to establishing a master/client relationship with regard to timing synchronization should be avoided if at all possible to allow as much of the communication capacity to be used for other functions, e.g., the communication of traffic data.

In view of the above discussion, it should be appreciated that there is a need for new and/or improved methods relating to timing synchronization between devices in a communications network such as a WiFi network. It would be desirable if a device with reliable timing synchronization could act as a master timing control device but with little or no overhead relating to the device explicitly signaling that it is acting as a master timing control device in the network.

SUMMARY

A communications device which intends to participate in a network, e.g., an ad-hoc peer to peer wireless communications network, receives an external timing reference signal, e.g., a GPS signal, and synchronizes itself with respect to the external reference signal. The communications device detects timing reference signals, e.g., beacon signals, from one or more other devices in the communications network. The communications device makes a determination as to whether or not the network is already synchronized to the external reference. If it is already synchronized to the external reference, the communications device may join the network and quickly participate in the network. However, if the communications device determines that the network is not synchronized to the external timing reference signal, the communications device can, and sometimes does, operate as a master timing control device. In various embodiments, when operating as a master timing control device the communications device communicates time stamps, e.g., in beacon signals, which indicate a greater passage of time than the actual passage of time. When operating as a master timing control device the communications device transmits network timing reference signals at a higher rate than is being used by the network, which is not synchronized to the external reference, to seize control of network timing and become the master timing control device. The communications device drives the network timing to synchronize network timing to the external timing reference. In some embodiments, once the communications device has synchronized network timing to the external timing reference the communications device transmits network timing reference signals at a predetermined rate which is lower than the rate used to drive the network timing to synchronization with the external reference source.

An exemplary method of operating a communications device corresponding to a communications network, in accordance with some embodiments, comprises: synchronizing to an external timing reference signal from a device outside said communications network; and operating as a master timing control device. In some such embodiments, operating as a master timing control device includes transmitting network timing reference signals, wherein individual successive transmitted network timing reference signals communicate a time stamp that indicates a passage of time from a preceding network timing reference signal that was transmitted by the communications device, said indicated passage of time being intentionally greater than the actual passage of time.

An exemplary communications device corresponding to a communications network, in accordance with some embodiments, comprises at least one processor configured to: synchronize to an external timing reference signal from a device outside said communications network; and operate as a master timing control device, wherein operating as a master timing control device includes transmitting network timing reference signals, individual successive transmitted network timing reference signals communicating a time stamp that indicates a passage of time from a preceding network timing reference signal that was transmitted by the communications device, said indicated passage of time being intentionally greater than the actual passage of time. The exemplary communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 2A is a first part of a flowchart of an exemplary method of operating a communications device in accordance with various exemplary embodiments.

DETAILED DESCRIPTION

Figure 1:
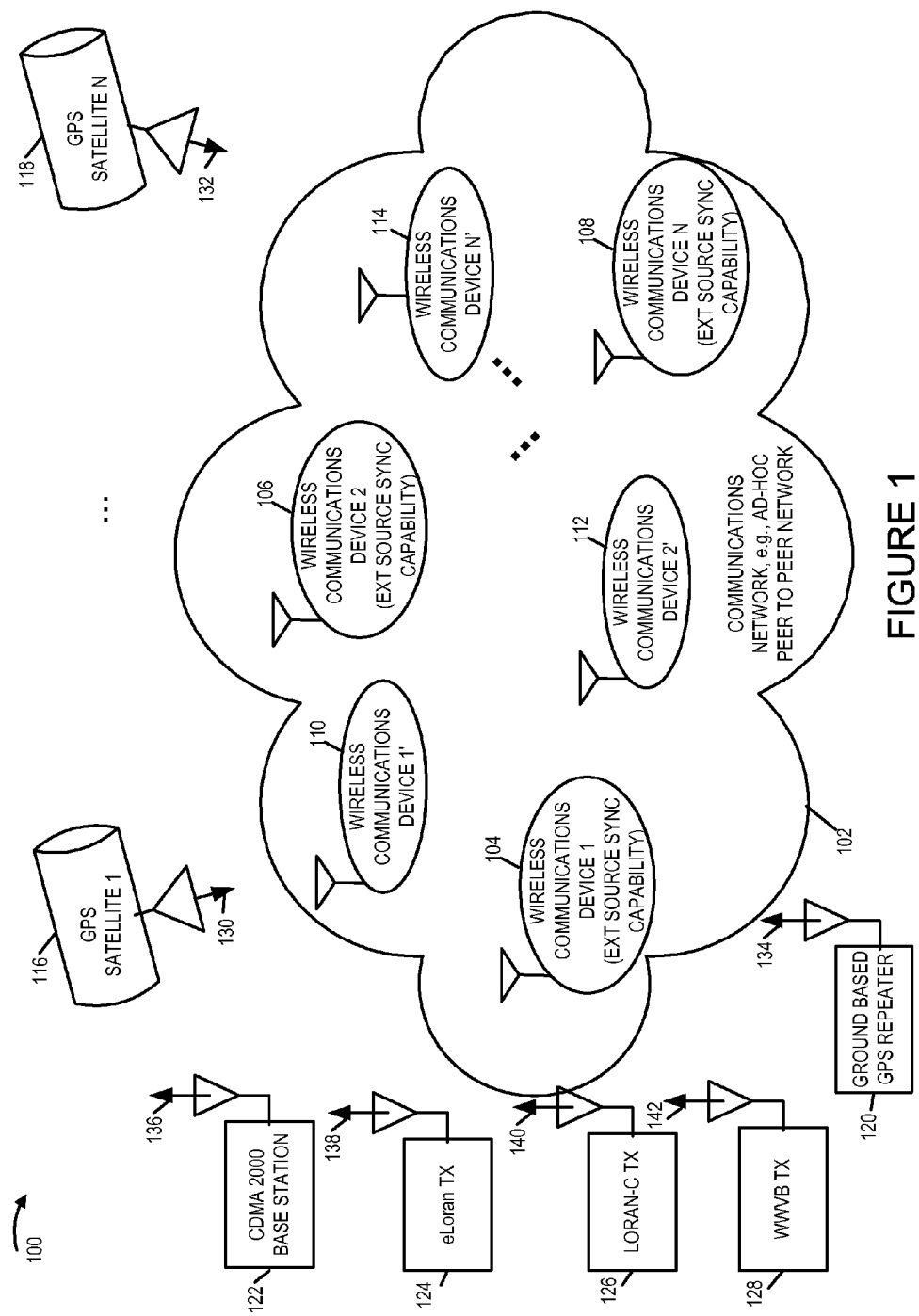
FIG. 1 is a drawing of an exemplary system in accordance with an exemplary embodiment.

FIG. 1 is a drawing of an exemplary system 100 in accordance with various exemplary embodiments. Exemplary system 100 includes a communications network 102, e.g., an ad-hoc peer to peer network, a plurality of GPS satellites (GPS satellite 1 116, . . . , GPS satellite N 118), a ground based GPS repeater 120, a CDMA 2000 base station 122, an eLoran transmitter station 124, a LORAN-C transmitter station 126, and a WWVB transmitter station 128. Each of the devices (satellite 1 116, GPS satellite N 118, ground based GPS repeater 120, CDMA 2000 base station 122, eLoran transmitter station 124, LORAN-C transmitter station 126, WWVB transmitter station 128) transmit a timing reference signal (130, 132, 134, 136, 138, 140, 142), respectively. In exemplary system 100, there may be, and sometimes are a plurality of communications networks such as network 102, e.g., ad-hoc peer to peer networks, e.g., as the wireless communications devices move throughout system 100 and form local networks at different locations which may be separated from one another.

Exemplary communications network 102 includes a plurality of wireless communications devices with the capability to perform timing synchronization with respect to an external timing reference signal transmitted from a device outside the communications network (wireless communications device 1 104, wireless communications device 2 106, . . . , wireless communications device N 108). In some embodiments, different ones of devices (104, 106, . . . , 108) may be able to perform timing synchronization with respect to different types of external timing synchronization sources. For example, device 1 104 may be able to perform timing synchronization using any one of signals (130, 132, 134, 136, 138, 140, 142), device 2 106 may be able to perform timing synchronization using any one of signal (130, 132, 134, 136) and device N 108 may be able to perform timing synchronization using any one of signals (130, 132, 134, 142). A device including the capability to timing synchronize with respect to an external source from outside the network, e.g., wireless communications device 1 104, may, and sometimes does act as a master timing control device in network 102. At different locations through system 100 one or more or all or none of the different types of external timing signals may be available. In some embodiments, there is a predetermined priority ordering to the external timing sources with regard to which type of source should be used to derive master timing control when multiple types of sources are available and the capability exists to use the multiple available sources. For example, in one embodiment the priority ordering, from highest to lowest, is: GPS signals, WWVB signals, CDMA 2000 signals, Loran-C signals, eLoran signals.

Communications network 102 also includes a plurality of wireless communications devices without the capability to perform timing synchronization with respect to aN external timing reference signal transmitted from a device outside the communications network (wireless communications device 1' 110, wireless communications device 2' 112, . . . , wireless communications device N' 114).

Figure 2B:
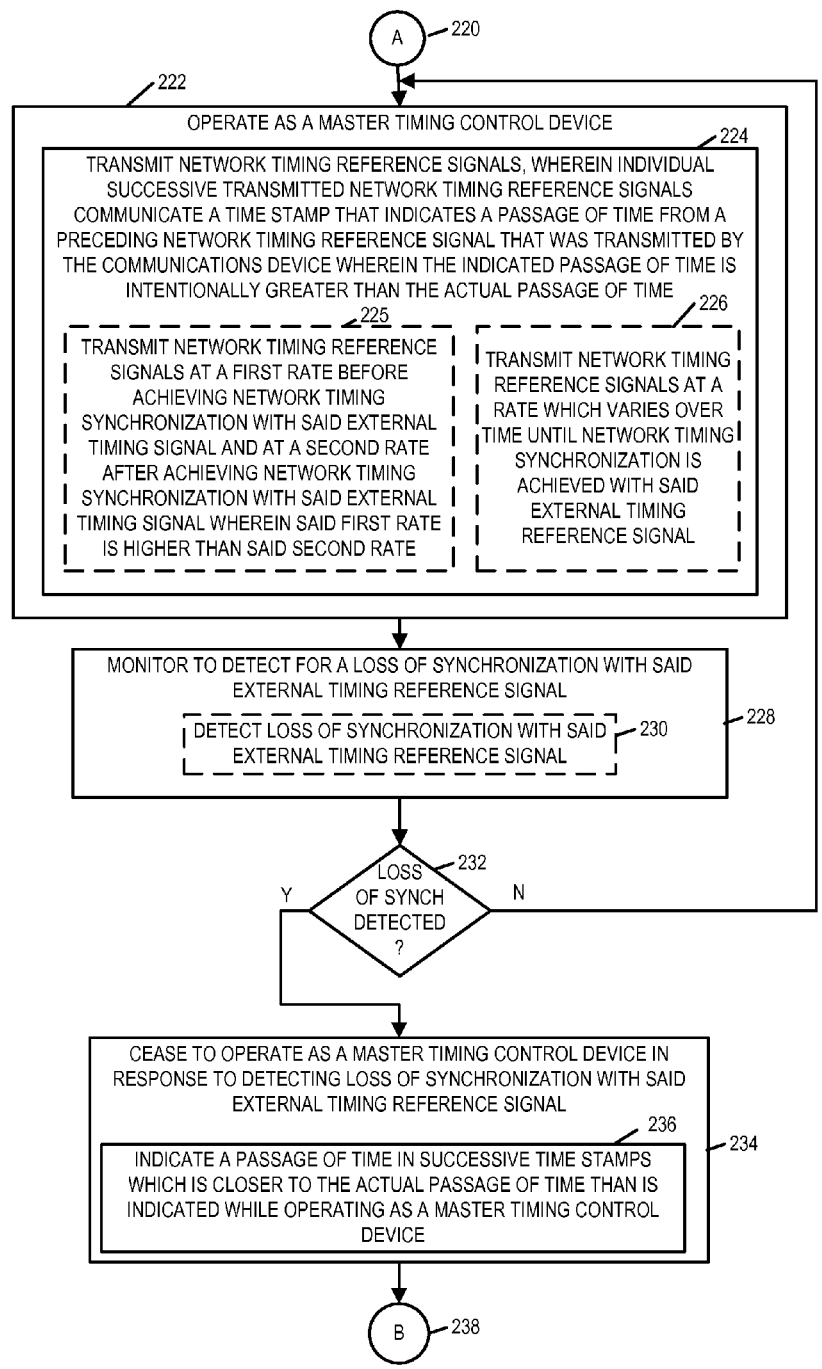
FIG. 2B is a second part of a flowchart of an exemplary method of operating a communications device in accordance with various exemplary embodiments.

FIG. 2, comprising the combination of FIG. 2A and FIG. 2B, is a flowchart 200 of an exemplary method of operating a communications device corresponding to a communications network, e.g., a communications network in which the wireless communications device participates, in accordance with an exemplary embodiment. The exemplary communications device implementing the method of flowchart 100 is, e.g., one of the wireless communications deviceS with external source synchronization capability (104, 106, . . . , 108) of FIG. 1. Operation starts in step 202, where the communications device is powered on and initialized. Operation proceeds from start step 202 to step 204. In step 204 the communications device synchronizes to an external timing reference signal from a device outside the communications network. For example, in some embodiments, the external timing reference signal is a GPS signal from a GPS satellite. Other exemplary types of external timing reference signals which are used, in some embodiments, include, e.g., WWVB signals, CDMA 2000 signals, Loran-C signals, eLoran signals. Operation proceeds from step 204 to step 206.

In step 206 the communications device monitors to detect network timing reference signals. Step 206 may, and sometimes does, include step 208 in which the communications device detects network timing reference signals. Operation proceeds from step 206 to step 210. In step 210 the communications device determines whether or not network timing reference signals have been detected and controls operation as a function of whether or not network timing reference signals have been detected in the monitoring of step 206.

If network timing reference signals have been detected, then operation proceeds from step 210 to step 212; otherwise operation proceeds from step 210 to connecting node A 220. Returning to step 212, in step 212 the communications device determines if the communications network is synchronized to said external timing reference signal. Operation proceeds from step 212 to step 214.

In step 214, if the network is already synchronized to said external timing reference signal, then operation proceeds from step 214 to connecting node A 220; otherwise, operation proceeds from step 214 to step 216. In step 216, the communications device determines a network timing reference slot time offset required to adjust said network timing to synchronize the communications network to the external timing reference signal. In some embodiments, operation proceeds from step 216 to step 218. In some other embodiments, operation proceeds from step 216 to connecting node A 220. Returning to step 218, in step 218 the communications device transmits a beacon slot start time adjustment signal indicating an adjustment to beacon slot timing to be made to synchronize beacon slot timing to said external timing reference signal. Operation proceeds from step 218 to connecting node A 220. Operation proceeds from connecting node A 220 to step 222.

In step 222 the communications device operates as a master timing control device. Step 222 includes step 224 in which the communications device transmits network timing reference signals, e.g., beacon signals, wherein individual transmitted network timing reference signals communicate a time stamp that indicates a passage of time from a preceding network timing reference signal that was transmitted by the communications device wherein the indicated passage of time is intentionally greater than the actual passage of time. In some embodiments, the indicated passage of time is greater than a passage of time than could be indicated by a physical clock operating with a permitted variation of device clock speed in said communications network. For example, WiFi specifies a maximum permitted variation and we want to be faster than the specified maximum permitted variation in terms of our artificial second indicated by successive transmitted timing reference signals from the communications device which is operating as a master timing reference signal. For example, our artificial second is set to be off by 50 parts per million (ppm) in the direction to indicate a faster clock than the real passage of time, while driving network timing toward synchronization with GPS timing. Then our artificial second is set to be off by 25 parts per million (ppm) in the direction to indicate a faster clock than the real passage of time, after network timing has synchronized with GPS timing.

Step 224 may, and in some embodiments does, include one or more of steps 225 and step 226. In step 225 the communications device transmits network timing reference signals at a first rate before achieving network timing synchronization with said external timing signal and at a second rate after achieving network timing synchronization with said external timing signal, wherein said first rate is higher than said first rate. In one example, the first rate is 1 Hz+50 ppm, and the second rate is 1 Hz+25 ppm. In step 226 the communications device transmits network timing reference signals at a rate which varies over time until network timing synchronization is achieved with said external timing reference signal. In some embodiments, including step 226, individual successive transmitted network timing reference signal, transmitted prior to achieving network timing synchronization with said external timing signal, communicate a time stamp that indicates a passage of time which is intentionally greater than the actual passage of time. In some such embodiments, the passage of time indicated by successive transmitted network timing reference signal before achieving network timing synchronization is greater than the actual passage of time by an amount which is larger than the amount corresponding to network timing reference signals transmitted after network timing synchronization is achieved with said external timing reference signal. For example, in one such embodiment, the communications device starts off with treating timing periods as occurring with offset of more than 25 micro-seconds, e.g., an initial offset of 50 micro-seconds and then gradually changes to 25 micro-seconds once timing synchronization is achieved with the external timing reference signal. In some embodiments, the communications device predominately uses a first timing period, e.g., with a 50 micro-second offset, prior to achieving timing synchronization between network timing and external timing, but may and sometimes does, alter the timing period for a small fraction of the time in which the network timing is being driven to the external reference timing, e.g., in order to more precisely align the network timing with the external reference timing. Operation proceeds from step 222 to step 228.

In step 228 the communications device monitors to detect for a loss of synchronization with said external timing reference signal. Step 228 may, and sometimes does, include step 230 in which the communications device detects a loss of synchronization with said external timing reference signal. Operation proceeds from step 228 to step 232.

In step 232, if a loss of synchronization was not detected in the monitoring of step 228, then operation proceeds from step 228 to step 222; otherwise, operation proceeds from step 228 to step 234. In step 234 the communications device ceases to operate as a master timing control device in response to detecting loss of synchronization with said external timing reference signal. Step 234 includes step 236. In step 236 the communications device indicates a passage of time in successive time stamps which is closer to the actual passage of time than is indicated while operating as a master timing control device. Operation proceeds from step 234 via connecting node B 238 to step 204.

Figure 3:
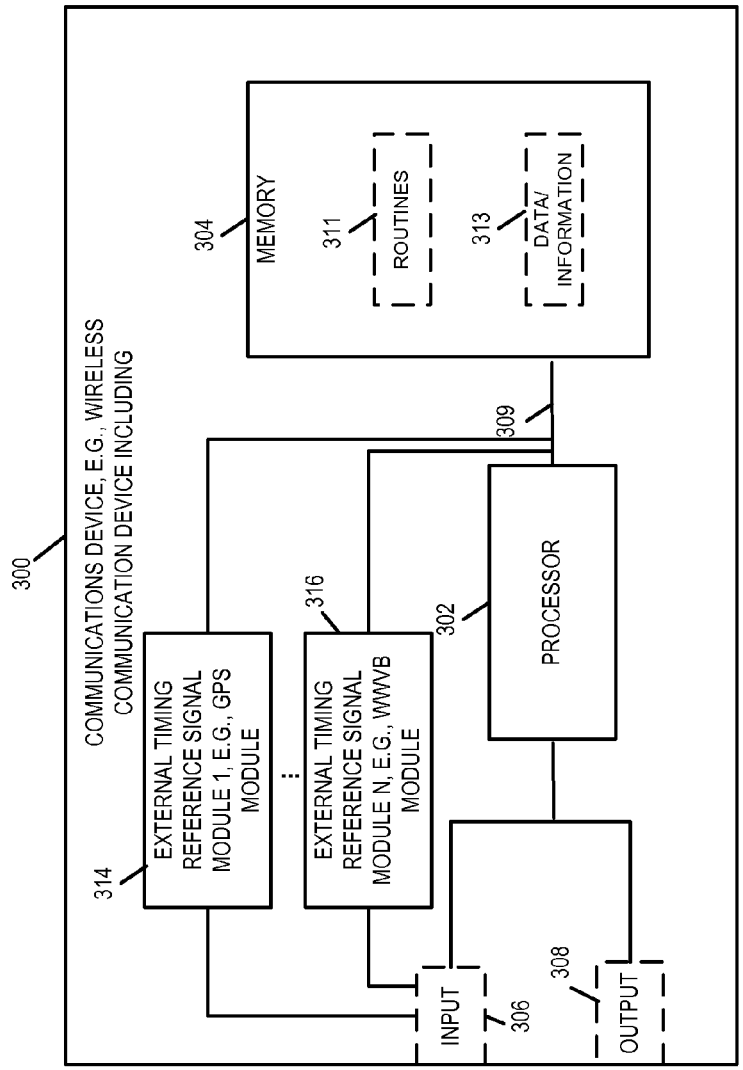
FIG. 3 is a drawing of an exemplary communications device in accordance with an exemplary embodiment.

FIG. 3 is a drawing of an exemplary communications device 300 corresponding to a communications network in accordance with an exemplary embodiment. Exemplary communications device 300 is, e.g., one of the wireless communications devices with external source synchronization capability (104, 106, ..., 108) of system 100 of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

Communications device 300 includes a plurality of external timing reference source modules (external timing reference source signal module 1 314, e.g., a GPS module, . . . , external timing source signal module N 316, e.g., a WWVB module). Each external timing reference source module, e.g., each of (314, . . . , 316) is used in receiving, processing and/or performing timing synchronization with respect a particular type of external timing reference source outside the communications network, e.g., outside an ad-hoc peer to peer communications network.

In some embodiments, processor 302 is configured to: synchronize to an external timing reference signal from a device outside said communications network; and operate as a master timing control device, wherein operating as a master timing control device includes transmitting network timing reference signals, individual successive transmitted network timing reference signals communicating a time stamp that indicates a passage of time from a preceding network timing reference signal that was transmitted by the communications device, said indicated passage of time being intentionally greater than the actual passage of time. In various embodiments, the indicated passage of time is greater than a passage of time that could be indicated by a physical clock operating within a permitted variation of device clock speeds in said communication network.

In various embodiments, processor 302 is further configured to: monitor to detect network timing reference signals, prior to transmitting network timing reference signals; and determine if said communications network is synchronized to said external timing reference signal, if network timing reference signals are detected.

In some embodiments, processor 302 is further configured to: determine a network timing reference slot time offset required to adjust said network timing to synchronize the communications network timing to the external timing reference signal, when it is determined that said network is not synchronized to said external timing reference signal. In some such embodiments, processor 302 is further configured to: transmit a beacon slot start time adjustment signal indicating an adjustment to beacon slot timing to be made to synchronize beacon slot timing to said external timing reference signal.

In some embodiments, processor 302 is configured to transmit network timing reference signals at a first rate before achieving network timing synchronization with said external timing signal and at a second rate after achieving network timing synchronization with said external timing signal, wherein the first rate is higher than the second rate. In some embodiments, processor 302 is configured to transmit network timing reference signals at a rate which varies over time until network timing synchronization is achieved with said external timing reference signal, as part of being configured to operate as a master timing control device. In some such embodiments, individual successive transmitted network timing reference signals, transmitted prior to achieving network timing synchronization with said external timing signal, communicate a time stamp that indicates a passage of time that is intentionally greater than an actual passage of time. In some embodiments, the passage of time indicated by successive transmitted network timing reference signals before achieving network timing synchronization with said external timing signal is greater than the actual passage of time by an amount which is larger than the amount corresponding to network timing reference signals transmitted after network timing synchronization is achieved with said external timing signal.

In some embodiments, processor 302 is further configured to: detect loss of synchronization with said external timing reference signal source; and cease to operate as a master timing control device in response to detecting loss of synchronization with said external timing reference signal source. In some embodiments, processor 302 is configured to indicate a passage of time in successive time stamps which is closer to the actual passage of time than is indicated while operating as a master timing control device, as part of being configured to cease to operate as a master timing control device.

Figures 4, 4A:
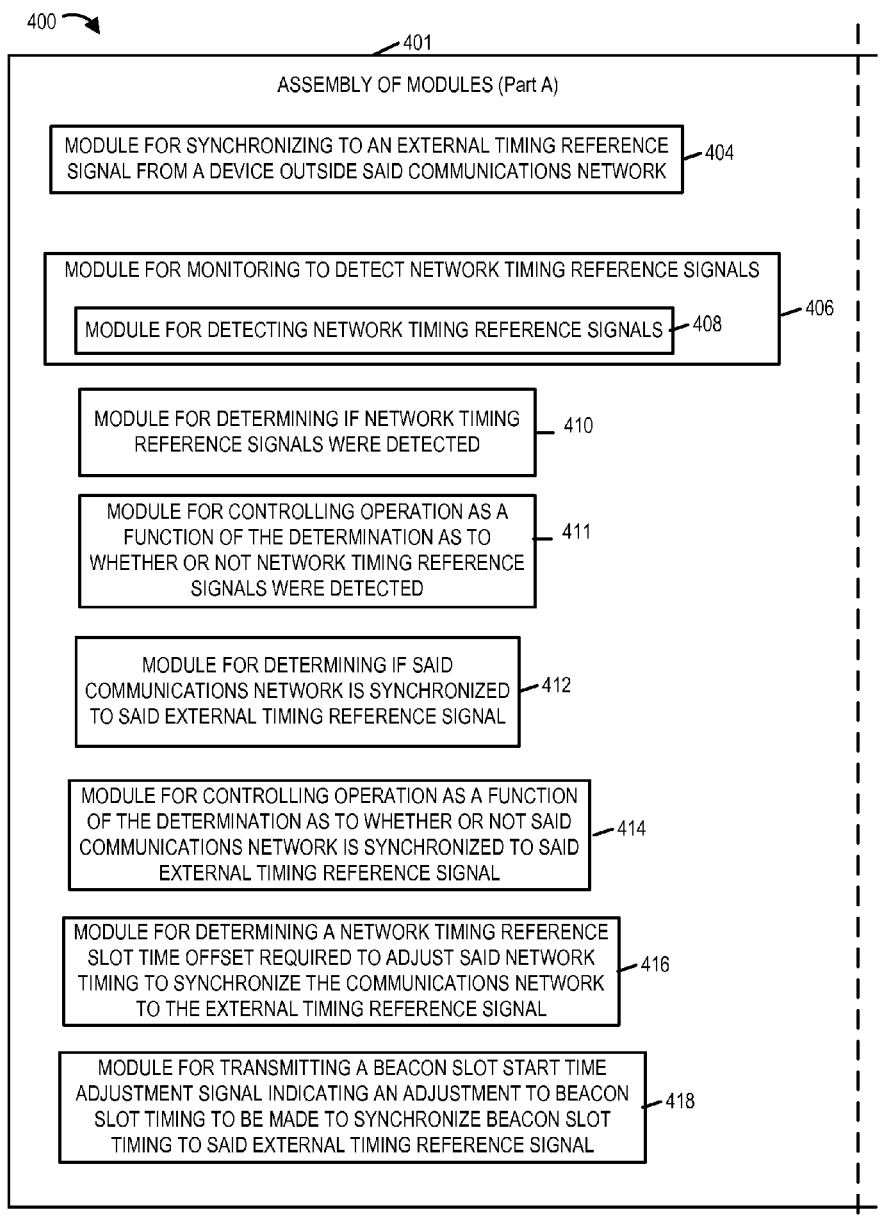
FIG. 4A is a first portion of an assembly of modules which can, and in some embodiments is, used in the exemplary wireless communications device illustrated in FIG. 3.
Figure 4B:
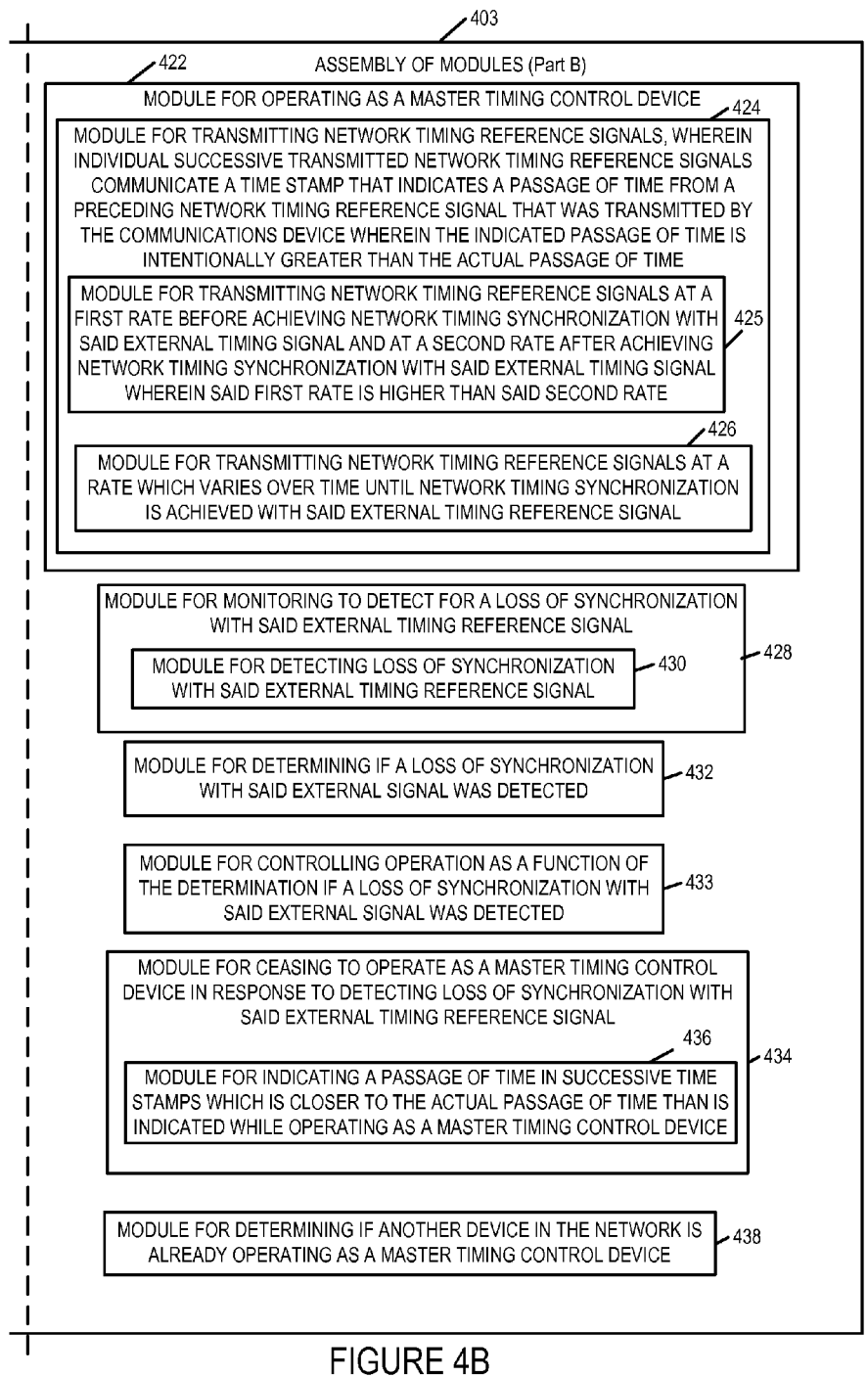
FIG. 4B is a second portion of an assembly of modules which can, and in some embodiments is, used in the exemplary wireless communications device illustrated in FIG. 3.

FIG. 4 is an assembly of modules 400 which can, and in some embodiments is, used in the exemplary wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400, comprising the combination of part A 401 and part B 403, includes a module for synchronizing to an external timing reference signal from a device outside said communications network 404, a module for monitoring to detect network timing reference signals 406, a module for determining if network timing reference signals were detected 410, and a module for controlling operation as a function of the determination whether or not network timing reference signals were detected 411. Module 406 includes a module for detecting network timing reference signals 408.

Assembly of modules 400 further includes a module for determining if said communications network is synchronized to said external timing reference signal 412, a module for controlling operation as a function of the determination as to whether or not said communications network is synchronized to said external timing reference signal 414, a module for determining a network timing reference slot offset required to adjust said network timing to synchronize the communications network to the external timing reference signal 416, and a module for transmitting a beacon slot time adjustment signal indicating an adjustment to the beacon slot timing to be made to synchronize beacon slot timing to said external timing reference signal.

Assembly of modules 400 further includes a module for operating as a master timing reference device 422. Module 422 includes a module 424 for transmitting network timing reference signals, wherein individual successive transmitted network timing reference signals communicate a time stamp that indicates a passage of time from a preceding network timing reference signal that was transmitted by the communications device where the indicated passage of time is intentionally greater than the actual passage of time. Module 424 includes a module for transmitting network timing reference signals at a first rate before achieving network timing synchronization with said external timing reference signals and at a second rate after achieving network timing synchronization with said external timing signal, wherein said first rate is higher than said second rate. Module 424 also includes a module for transmitting network timing reference signals at a rate which varies over time until network timing synchronization is achieved with said external timing reference signal 426.

Assembly of modules 400 further includes a module for monitoring to detect for a loss of synchronization with said external time reference signal 428, a module for determining if a loss of synchronization with said external timing reference signal was detected 432, a module controlling operation as a function of the determination if a loss of synchronization with said external signal was detected 433, and a module for ceasing to operate as a master timing control device in response to detecting loss of synchronization with said external timing reference signal 434. Module 428 includes a module for detecting loss of synchronization with said external timing reference signal 430. Module 434 includes a module for indicating a passage of time in successive time stamps which is closer to the actual passage of time than is indicated while operating as a master timing control device 436.

Assembly of modules 400 further includes a module 438 for determining if another device in the network is already operating as a master timing control device. In some embodiments, module 438 determines that a device is already operating as a master timing control device based on the rate of detected timing reference signals from the device, e.g., an estimated beacon clock rate of the device, corresponding to a predetermined value.

Various aspects and/or features of some embodiments will be further discussed below. In some embodiments, a device acts as a master in a WiFi or similar network where devices adjust their internal timing in a forward direction based on timing signals received from other devices without the need for a device to expressly signal that it is acting as a master timing control device.

In accordance with one aspect, a device first determines whether or not it should act as a timing master. The determination, in some embodiments, is based on whether or not the device has access to a reliable external timing source such as a GPS signal and/or whether or not another device is currently acting as a timing master. Whether or not another device is acting as a timing master, in some embodiments, may be, and sometimes is, inferred from the rate at which a timing master transmits timing reference signals.

If a device determines that it is not to act as a timing master, it performs synchronization based on beacon signals it receives and updates its own timing based on the received beacon signals as necessary.

However, if a device determines that it is to act as a timing master, the device intentionally transmits using a clock rate that is faster than real time and, in accordance with one aspect, faster than the fastest rate expected for clocks in the system to operate at if keeping to real time. For example, in one example in one embodiment, the clock rate when operating as a timing master is controlled so that 1 second-25 μsec is treated as a second rather than 1 second, where 25 μsec is larger than the normal per second clock variance expected from devices in the system. Some other fraction of a second may be maintained but, while operating as the master, the device timing being updated at a rate which is faster than, but synchronized to, real time. For example, while the device operating as a master may update its indication of the current time to indicate that a second has passed for each X seconds where X is a fraction of a second less than 1, the update rate is maintained in a consistent manner relative to real time. This synchronization may be based on synchronization to a reliable external timing source such as a GPS signal or some other signal. Thus, while operating the master device to indicate times that change at a rate which is faster then real time, synchronization between the devices can be maintained based on the signals transmitted by the master device without the master device expressly having to signal that it is, in fact, operating as a master device.

A master device may, and in some embodiments does, relinquish its role by simply switching back to transmitting beacon signals at a rate based on real time rather than the accelerated understanding of time used when operating as a master device.

In some embodiments, another device in the system may and sometimes does, at any time, assume the master role by selecting and using an artificially high clock rate which is even faster than the rate in use by a device operating as a master at a given point in time.

The device operating as the timing master indicates its current time, which is based on the intentionally fast clock rate, in the beacon signals it transmits. Devices receiving the signal operate in a normal manner. That is, devices receiving a beacon signal from the master will determine that the time indicated in the received beacon signal is ahead of their own internal time and adjust their internal time and/or clock rate to synchronize to the beacon signal of the device operating as the master.

While devices other than the device operating as the master timing device will transmit their understanding of time in their beacon signals, given that their understanding of time will be behind the time indicated by the device operating as a master, devices receiving the beacon signals from devices operating in an ordinary manner will not alter there time based on the signals and will remain synchronized to the device operating as a master timing control device.

In various embodiments the device operating as a master is a WiFi device synchronizing to a global timing source using an out of band signal, and using this timing information for running certain applications over the WiFi channel. Exemplary timing sources that could be, and in some embodiments are used include: GPS, eLoran/LORAN-C, CDMA 2000, and WWVB.

The approach described herein allows the majority of the devices in a system to operate in a normal manner with one or a few devices supporting the capability of external timing synchronization and operating as a master device in accordance with one aspect. In some embodiments, this approach doesn't require hardware changes to most legacy WiFi chips while allowing them to be controlled by a device operating as a master control device and without requiring the legacy devices to even know that a device in the system is intentionally acting as a master timing control device.

In some embodiments enhanced WiFi capable devices use an external source to synchronize to a global timing reference. In some embodiments, these enhanced devices have modified hardware in them to acquire this timing information. In some embodiments, after synchronizing to an external timing source, these enhanced devices start an adhoc network which is an enhanced network with:

One of pre-agreed names or SSIDs e.g. "Globally Synced WiFi"

One of pre-agreed beacon periods e.g. 100 ms, 1 second, 10 second

One of pre-agreed timing reference, e.g. synchronized to GPS second

Now, the legacy devices are not synchronized to the global time reference, but at a slower rate they can monitor for existence of enhanced networks with the pre-agreed upon SSIDs. After an enhanced network has been discovered, the legacy devices join the network, and achieve power efficiency because of the duty cycle due to beacon periods, and further propagate timing information to other legacy devices.

Note that each of devices using this solution would wake up at the similar times (up to propagation delays which should be minimal), since they will be synchronized indirectly to the same timing source. This could enable power efficient operation for applications such as: (i) exchange of peer discovery/presence information, (ii) exchange of traffic routing information, e.g. for multihop communication, (iii) connection setup requests, and (iv) traffic monitoring for requests indicating intention to transmit.

Note that each of these examples are applications that the device may be doing even if it is in the sleep mode, so an efficient implementation of these will significantly increase the stand by time of the device.

Figure 5:
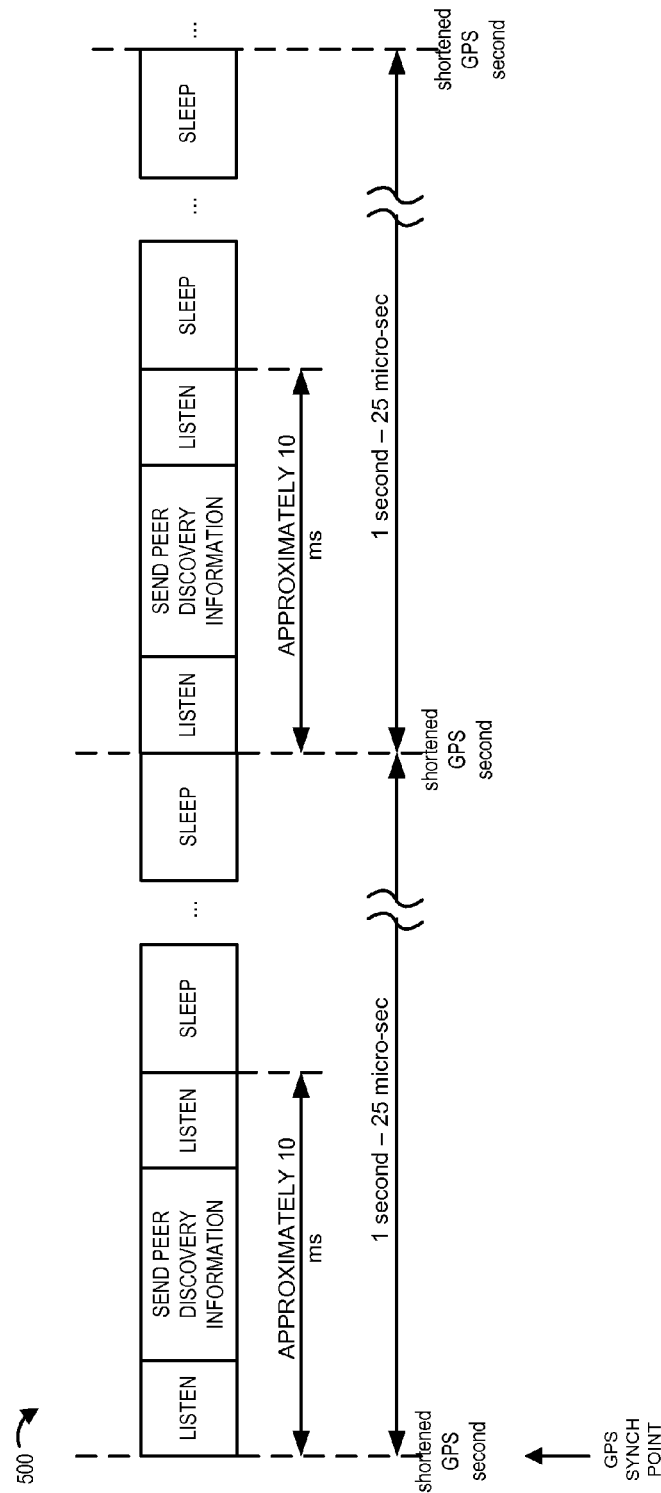
FIG. 5 illustrates an example in which a wireless communications device operates as a master timing control device and peer to peer wireless communications devices in an ad-hoc network are synchronized with an external timing reference signal, e.g., a GPS 1 second signal, via the master timing control device, thus facilitating the exchange of peer discovery signals at a predetermined time interval and facilitating sleep intervals and power conservation.
Figure 6:
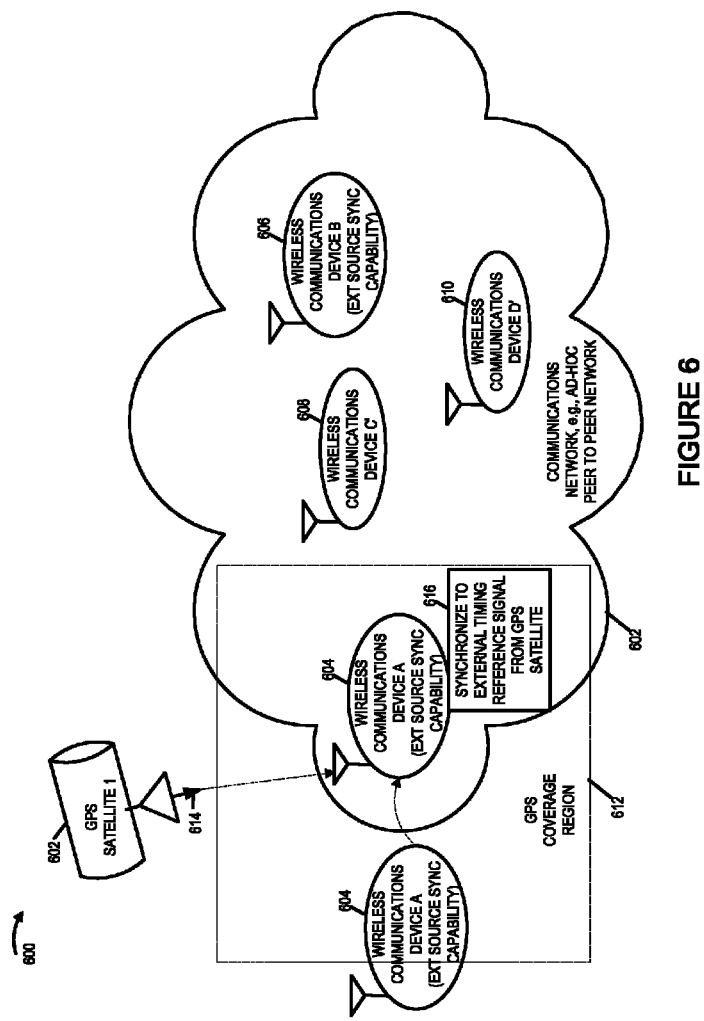
FIG. 6 is a drawing illustrating an exemplary wireless communications device synchronizing with respect to an external timing reference source in accordance with an exemplary embodiment.

Drawing 500 of FIG. 5 shows one typical implementation where the external timing reference is the GPS second, and the beacon period is one second-25 micro-seconds, and the information being exchanged is peer discovery/presence information. In this case, the devices wake up every shortened GPS second (synchronized to the GPS second), and stay awake for a certain amount of time. This awake time could be fixed or could depend on the interference environment seen. If there is no active connection, that the device is involved in, then the device goes to sleep till the next shortened GPS second.

Note that in some embodiments, legacy devices can participate in this if they are in proximity, e.g., multi-hop proximity, of an enhanced device. Also, in some embodiments, the legacy device includes some firmware/software change to configure it to listen for enhanced networks on a slow time scale, and then after discovering an enhanced network use it in an appropriate power efficient way to run various applications, e.g., various applications which would consume large amounts of power without timing synchronization allowing for sleep intervals and limited times of activity.

FIGS. 6-10 illustrate an example in which a wireless communications device synchronizes to an external timing reference sources and operates as a master timing control device in accordance with an exemplary embodiment. In drawing 600 of FIG. 6, there is a GPS satellite 602 transmitting a GPS signal 614 communicating reference timing information, and there is a GPS coverage area 612. Drawing 600 of FIG. 6 also illustrates an exemplary communications network 602, e.g., an ad-hoc peer to peer network. Consider that the ad-hoc peer to peer network includes wireless communications device B 606, wireless communications device C' 608 and wireless communications device D' 610. Further consider that wireless communications device A 604 has recently entered a coverage region of the communications network 602 and would like to participate in the network. Wireless communications device A 604 and wireless communications device B 606 include external source synchronization capability, e.g., devices 604 and 606 can receive and process GPS signals and synchronize with respect to a GPS timing reference.

Device A 604 which is located within GPS coverage area 612 receives GPS signal 614 transmitted from GPS satellite 1 602 and synchronizes to the external timing reference signal form the GPS satellite as indicated by box 616.

Figure 7:
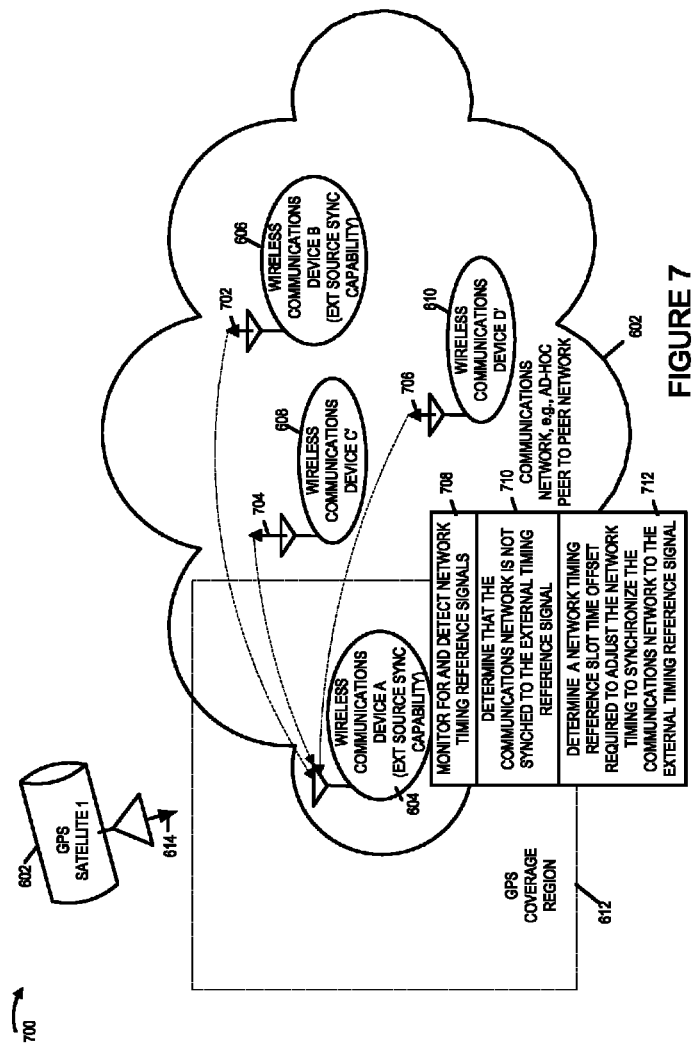
FIG. 7 is a drawing illustrating an exemplary wireless communications device detecting network timing signals and determining that the network is not synchronized to the external timing reference source in accordance with an exemplary embodiment.

In drawing 700 of FIG. 7, wireless communications device A 604 monitors for and detects network timing reference signals as indicated by box 708. The detected network timing reference signals are signals (702, 704, 706), e.g., beacon signals, which have been transmitted by wireless communications devices (606, 608, 610), respectively. Wireless communications device A 604 determines that the communications network is not synchronized to the external timing reference signal, the GPS signal, as indicated by block 710. Wireless communications device A 604 determines a network timing reference slot, e.g., beacon slot, time offset required to adjust the network timing to synchronize the communications network to the external timing reference signals as indicated by box 712.

Figure 8:
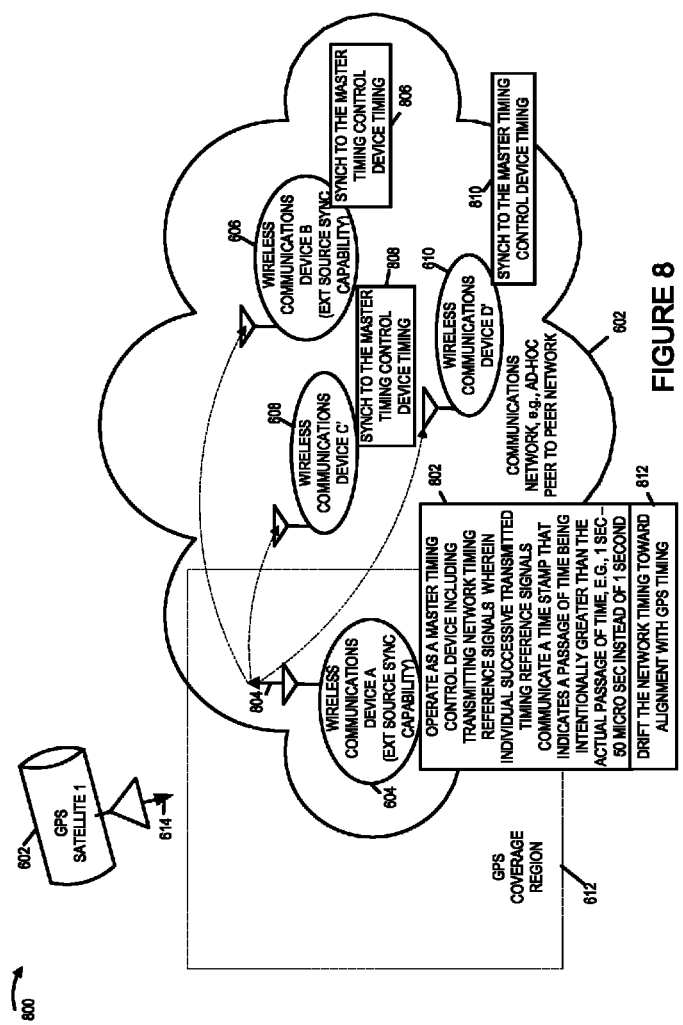
FIG. 8 is a drawing illustrating an exemplary wireless communications device serving as a master timing control device in which the wireless communications device drives network timing to synchronize to the external timing reference in accordance with an exemplary embodiment.

In drawing 800 of FIG. 8 wireless communications device A 604 operates as a master timing control device including transmitting network timing reference signals wherein individual successive transmitted timing reference signals communicate a time stamp that indicates a passage of time being intentionally greater than the actual passage of time, e.g., 1 second-50 micro-seconds instead of an actual passage of time of 1 second. Arrow 804 represents the transmitting network timing reference signals wherein individual successive transmitted timing reference signals communicate a time stamp that indicates a passage of time being intentionally greater than the actual passage of time. Signals 804 are received by wireless communications devices (606, 608, 610), which synchronize to the master timing control device timing as indicated by boxes (806, 808, 810), respectively. As wireless communications device transmits network timing reference signals 804 the network timing drifts toward the alignment with GPS timing as indicated by block 812.

Figure 9:
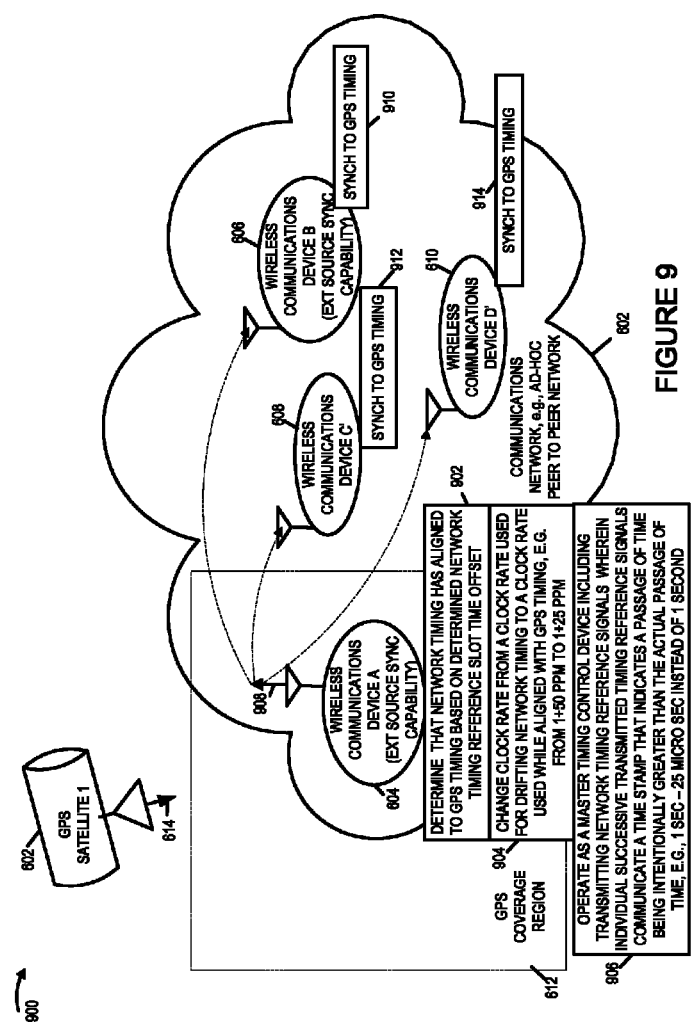
FIG. 9 is a drawing illustrating an exemplary wireless communications device continuing to serve as a master timing control device after the network timing has been synchronized with respect to the external timing reference in accordance with an exemplary embodiment.

In drawing 900 of FIG. 9 wireless communications device A 604 continues to operate as a master timing control device. At some point in time, wireless communications device A 604 determines that network timing has aligned to the GPS timing, e.g., based on the determined network timing reference slot offset as indicated by block 902. Then, wireless communications device A 604 changes its clock rate from a clock rate used for drifting network timing to a clock rate used while network timing is aligned with GPS timing, e.g., from 1 Hz+50 ppm to 1 Hz+25 ppm, as indicated by block 904. Wireless communications device A 604 continues to operate as a master timing control device including transmitting network timing reference signals wherein individual successive transmitted timing reference signals communicate a time stamp that indicates a passage of time being intentionally greater than the actual passage of time, e.g., 1 second-25 micro-seconds instead of an actual passage of time of 1 second, as indicated by block 906. Arrow 908 represents the transmitting network timing reference signals wherein individual successive transmitted timing reference signals communicate a time stamp that indicates a passage of time being intentionally greater than the actual passage of time. Signals 908 are received by wireless communications devices (606,

608, 610), which synchronize to the master timing control device timing resulting in synchronization to GPS timing as indicated by boxes (910, 912, 914), respectively.

If another device synchronized to GPS moves into network 602, the device entering the network 602 can immediately join and participate in the network.

Figure 10:
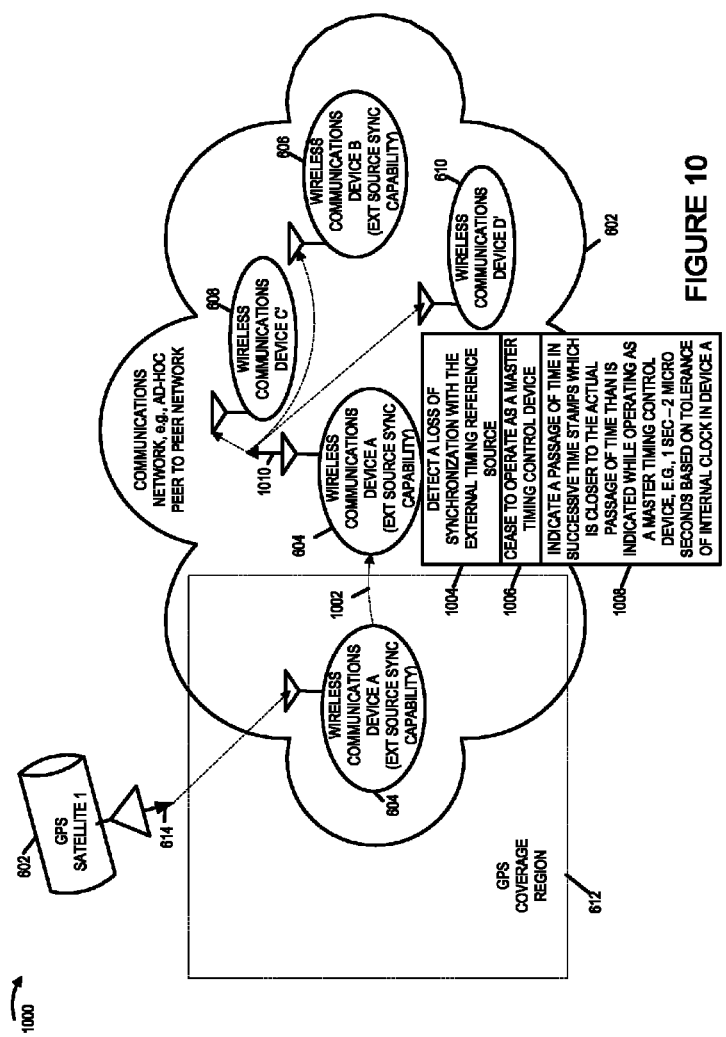
FIG. 10 is a drawing illustrating that an exemplary wireless communications device ceases to operate as a master timing control device in response to detecting a loss of synchronization with the external timing reference in accordance with an exemplary embodiment.

In drawing 1000 of FIG. 10, wireless communications device A 604 has moved outside the GPS coverage region 612 as indicated by dashed arrow 1002. Wireless communications device A 604 detects a loss of synchronization with the external timing reference source, which is GPS, as indicated by block 1004. Wireless communications device A 604 ceases to operate as a master timing control device in response to the detected loss of synchronization with the external timing reference source as indicated by block 1006. As part of ceasing to operate as a master timing control device wireless communications device A 604 indicates a passage of time in successive time stamps which is closer to the actual passage of time than is indicated while operating as a master timing control device as indicated by block 1008. In one example, the passage of time indicated in the time stamps is 1 sec-2 micro-seconds based on the tolerance of the internal clock in device A where the actual passage of time is 1 sec. Device A 604 transmits network timing signals 1010 indicating a passage of time which is closer to the actual passage of time than is indicated while operating as a master timing control device. If device A 604 or device B 606 moves into the GPS coverage region, the device in the GPS coverage region may synchronize to GPS and serve as a master timing control device.

Figure 11:
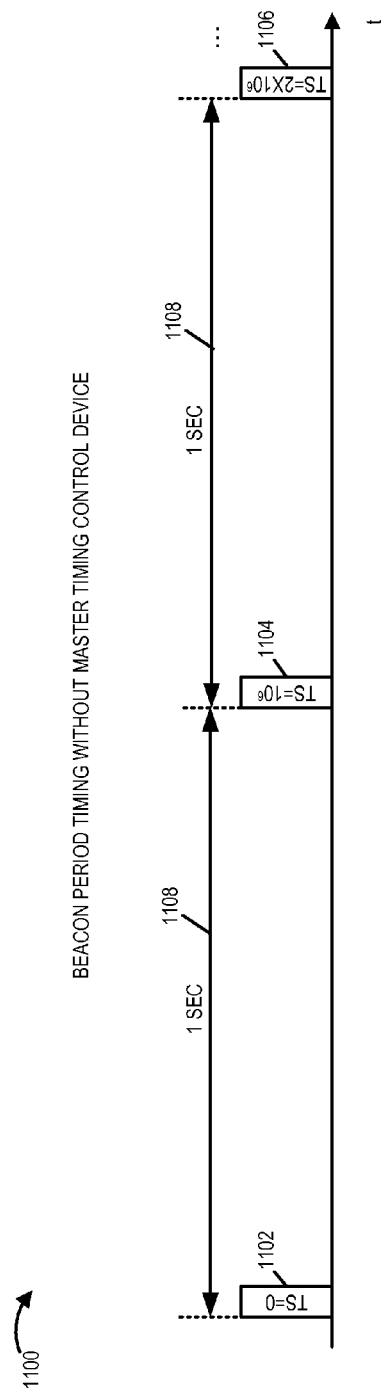
FIG. 11 illustrates exemplary beacon period timing without a master timing control device in accordance with an exemplary embodiment.

Drawing 1100 of FIG. 11 illustrates exemplary beacon period timing without a master timing control device in accordance with an exemplary embodiment. Beacon signals are transmitted with a period of 1 second 1108. First beacon signal 1102 communicates a time stamp of 0, second beacon signal 1104 communicates a time stamp of $10^6$, and third beacon signal 1106 communicates a time stamp of $2\times10^6$. Consider that time stamps represent micro seconds. In this example the indicated time in the time stamps matches the actual passage of time.

Figure 12:
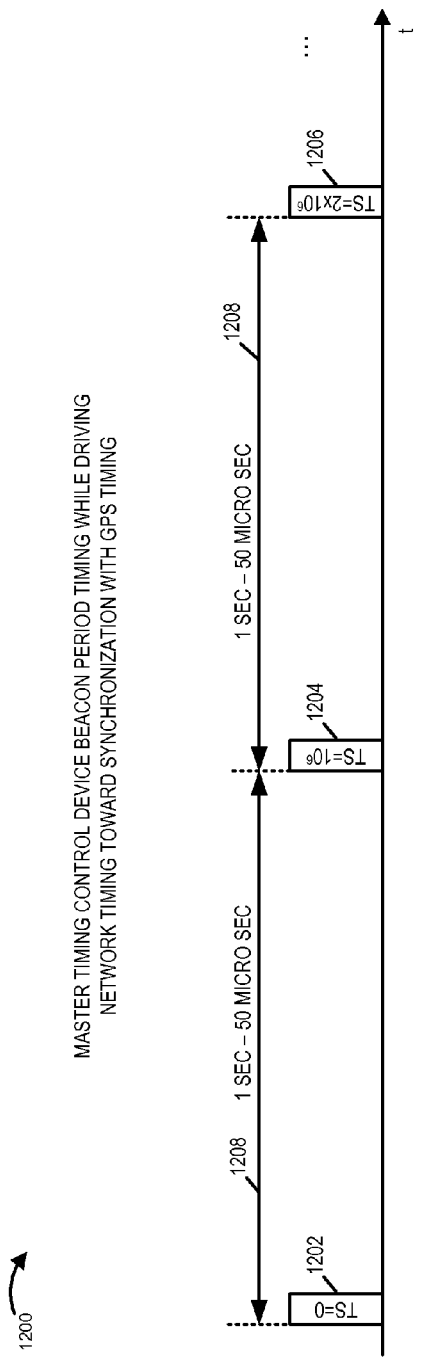
FIG. 12 illustrates exemplary master timing control device beacon period timing while driving network timing toward synchronization with GPS timing in accordance with an exemplary embodiment.

Drawing 1200 of FIG. 12 illustrates exemplary master timing control device beacon period timing while driving network timing toward synchronization with GPS timing in accordance with an exemplary embodiment. Beacon signals are transmitted with a period of: 1 second-50 micro-sec 1208. First beacon signal 1202 communicates a time stamp of 0, second beacon signal 1204 communicates a time stamp of $10^6$, and third beacon signal 1206 communicates a time stamp of $2\times10^6$. Consider that time stamps represent micro seconds. In this example the indicated time in the time stamps does not match the actual passage of time. In this example, the time stamp for second beacon 1204 is 50 micro-seconds higher than the actual time, and the time stamp for the third beacons 1206 is 100 micro-seconds higher than the actual time.

Figure 13:
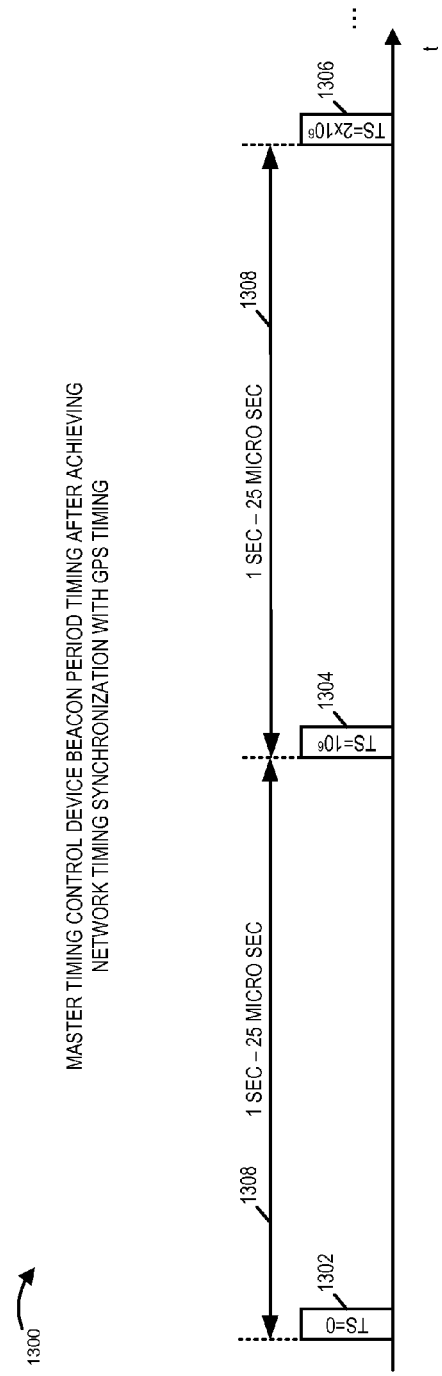
FIG. 13 illustrates exemplary master timing control device beacon period timing after achieving network timing synchronization with GPS timing in accordance with an exemplary embodiment.

Drawing 1300 of FIG. 13 illustrates exemplary master timing control device beacon period timing after achieving network timing synchronization with GPS timing in accordance with an exemplary embodiment. Beacon signals are transmitted with a period of: 1 second-25 micro-sec 1308. First beacon signal 1302 communicates a time stamp of 0, second beacon signal 1304 communicates a time stamp of $10^6$, and third beacon signal 1306 communicates a time stamp of $2\times10^6$. Consider that time stamps represent micro seconds. In this example the indicated time in the time stamps does not match the actual passage of time. In this example, the time stamp for second beacon 1304 is 25 micro-seconds higher than the actual time, and the time stamp for the third beacons 1306 is 50 micro-seconds higher than the actual time.

In some embodiments, the time stamp=(actual time-$T_0$) $(10^6)$(Beacon rate), where $T_0$ is an external reference signal start time and where Beacon rate is specified in Hz. In such an embodiment, the time stamp may also be expressed as: time stamp=(actual time-$T_0$)$(10^6)$/(Beacon interval), where Beacon Interval is specified in seconds. In some embodiments, the external reference signal is a GPS signal and $T_0$ is a GPS start time, e.g., the GPS epoch which is 00:00 midnight UTC on 1980-01-06. In the example, of FIGS. 12 and 13, where a wireless communications device is operating as a master timing control device, the beacon rate has been artificially sped up. In various existing WiFi protocols, the fastest clock becomes the master timing control device; therefore, by artificially speeding up a clock of a device, which is already synchronized to an external timing reference, the device with the sped up clock becomes the master and can synchronize network timing to the external timing reference.

Various embodiments are directed to achieving distributed synchronization without any infrastructure. Various benefits from achieving distributed synchronization include power saving and collision avoidance between discovery messages. In some embodiments, a fraction of the nodes in the network are GPS connected or connected to another external timing reference source external to the communications network. In some networks the synchronization protocol, e.g., a 802.11 based synchronization protocol, is such that the clocks in the network are synchronized to the fastest clock.

In various embodiments, GPS or another external timing reference source such as, e.g., CDMA, etc., provides accurate time and frequency synchronization for some devices in the network, and is used by those devices to obtain synchronization to the external timing reference. However, not all the devices in the network, e.g., a peer to peer ad-hoc network, may have access to the external reference due to device capabilities and/or current device location. In various embodiments, a communications device with the capability to synchronize to the external sources, e.g., GPS, can co-exist with other devices and force the network to converge to be synchronized to the external source timing, e.g., GPS time. In some embodiments, legacy devices in the network can synchronize without any change to the legacy devices.

Consider that the external timing reference source is GPS. Further consider an initial network without a GPS capable node. The network follows its own time and frequency. Further consider that a GPS connected node joins the network. The GPS connected node would like to synchronize the network based on the GPS timing reference. The GPS connected node artificially speeds up its clock to be the fastest. For example, a 802.11 spec specifies that clocks should be 1+/-25 ppm. The GPS connected node adopts a rate of 1+25 ppm to be the fastest clock in the network. The adopted clock rate of 1+25 ppm may also be expressed as a time interval of 1 second-25 microseconds. In some embodiments, any network that has a GPS connected node will run at the same rate, e.g., 1+25 ppm. In some embodiments, the WiFi synchronization protocol naturally converges to the fastest clock in the network. In this example, the new network converges to a common global rate of 1+25 ppm which is not the GPS rate but is close enough to achieve the desired purpose.

In some embodiments, the GPS connected node is able to convert the network to GPS time. The GPS connected node artificially advances time to drift the network to GPS time. For example, the GPS connected node uses a faster clock when trying to correct time, e.g., 1+50 ppm. Once time is aligned, the GPS connected node falls back to the natural rate of 1+25 ppm. In one example, if the network is initially 500 ms off from the GPS second, then the GPS connected node provides a correction of 25 ms each second which will take 20 seconds to convert to GPS time, after which the GPS connected node will follow the standard protocol.

In various embodiments a communications device, e.g., a wireless communications device (104, 106, . . . , 108) in system 100 of FIG. 1, and/or communication device 300 of FIG. 3 and/or wireless communications device 604 of FIG. 6-10 and/or wireless communications device 606 of FIGS. 6-10 or a wireless communications device implementing beacon signaling in accordance with FIG. 12 and/or FIG. 13 includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol, e.g., where direct device to device communication is supported. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device corresponding to a communications network, the method comprising:
   synchronizing to an external timing reference signal from a device outside said communications network; and
   operating as a master timing control device, wherein operating as a master timing control device includes transmitting network timing reference signals, individual successive transmitted network timing reference signals communicating a time stamp that indicates a passage of time from a preceding network timing reference signal that was transmitted by the communications device, said indicated passage of time being intentionally greater than the actual passage of time.

2. The method of claim 1, further comprising:
   prior to transmitting network timing reference signals, monitoring to detect network timing reference signals; and
   if network timing reference signals are detected, determining if said communications network is synchronized to said external timing reference signal.

3. The method of claim 2, further comprising:
   when it is determined that said network is not synchronized to said external timing reference signal, determining a network timing reference slot time offset required to adjust said network timing to synchronize the communications network timing to the external timing reference signal.

4. The method of claim 3, further comprising transmitting a beacon slot start time adjustment signal indicating an adjustment to beacon slot timing to be made to synchronize beacon slot timing to said external timing reference signal.

5. The method of claim 3, wherein operating as a master timing control device includes:
   transmitting network timing reference signals at a rate which varies over time until network timing synchronization is achieved with said external timing reference signal.

6. The method of claim 5, wherein individual successive transmitted network timing reference signals, transmitted prior to achieving network timing synchronization with said external timing signal, communicate a time stamp that indicates a passage of time that is intentionally greater than an actual passage of time.

7. The method of claim 6, wherein the passage of time indicated by successive transmitted network timing reference signals before achieving network timing synchronization with said external timing signal is greater than the actual passage of time by an amount which is larger than the amount corresponding to network timing reference signals transmitted after network timing synchronization is achieved with said external timing signal.

8. The method of claim 1, wherein said indicated passage of time is greater than a passage of time that could be indicated by a physical clock operating within a permitted variation of device clock speeds in said communication network.

9. The method of claim 1, further comprising:
   detecting loss of synchronization with said external timing reference signal source; and
   ceasing to operate as a master timing control device in response to detecting loss of synchronization with said external timing reference signal source.

10. A communications device corresponding to a communications network, the communications device comprising:
    means for synchronizing to an external timing reference signal from a device outside said communications network; and
    means for operating as a master timing control device including means for transmitting network timing reference signals, wherein individual successive transmitted network timing reference signals communicate a time stamp that indicates a passage of time from a preceding network timing reference signal that was transmitted by the communications device, said indicated passage of time being intentionally greater than the actual passage of time.

11. The communications device of claim 10, further comprising:
    means for monitoring to detect network timing reference signals, prior to transmitting network timing reference signals; and
    means for determining if said communications network is synchronized to said external timing reference signal, if network timing reference signals are detected.

12. The communications device of claim 11, further comprising:
    means for determining a network timing reference slot time offset required to adjust said network timing to synchronize the communications network timing to the external timing reference signal, when it is determined that said network is not synchronized to said external timing reference signal.

13. The communications device of claim 12, further comprising means for transmitting a beacon slot start time adjustment signal indicating an adjustment to beacon slot timing to be made to synchronize beacon slot timing to said external timing reference signal.

14. The communications device of claim 12, wherein said means for operating as a master timing control device includes means for transmitting network timing reference signals at a rate which varies over time until network timing synchronization is achieved with said external timing reference signal.

15. A computer program product for use in a communications device corresponding to a communications network, the computer program product comprising:
    a non-transitory computer readable medium comprising:
        code for causing at least one computer synchronize to an external timing reference signal from a device outside said communications network; and
        code for causing said at least one processor to operate as a master timing control device, wherein said code for causing said at least one processor to operate as a master timing control device includes code for causing said at least one processor to transmit network timing reference signals, individual successive transmitted network timing reference signals communicating a time stamp that indicates a passage of time from a preceding network timing reference signal that was transmitted by the communications device, said indicated passage of time being intentionally greater than the actual passage of time.

16. A communications device corresponding to a communications network comprising:
 at least one processor configured to:
  synchronize to an external timing reference signal from a device outside said communications network; and
  operate as a master timing control device, wherein operating as a master timing control device includes transmitting network timing reference signals, individual successive transmitted network timing reference signals communicating a time stamp that indicates a passage of time from a preceding network timing reference signal that was transmitted by the communications device, said indicated passage of time being intentionally greater than the actual passage of time; and
 memory coupled to said at least one processor.

17. The communications device of claim 16, wherein said at least one processor is further configured to:
 monitor to detect network timing reference signals, prior to transmitting network timing reference signals; and
 determine if said communications network is synchronized to said external timing reference signal, if network timing reference signals are detected.

18. The communications device of claim 17, wherein said at least one processor is further configured to:
 determine a network timing reference slot time offset required to adjust said network timing to synchronize the communications network timing to the external timing reference signal, when it is determined that said network is not synchronized to said external timing reference signal.

19. The communications device of claim 18, wherein said at least one processor is further configured to:
 transmit a beacon slot start time adjustment signal indicating an adjustment to beacon slot timing to be made to synchronize beacon slot timing to said external timing reference signal.

20. The communications device of claim 18, wherein said at least one processor is configured to transmit network timing reference signals at a rate which varies over time until network timing synchronization is achieved with said external timing reference signal, as part of being configured to operate as a master timing control device.

\* \* \* \* \*